(12) United States Patent
Bargh

(10) Patent No.: US 11,215,288 B2
(45) Date of Patent: Jan. 4, 2022

(54) PROPORTIONAL PINCH VALVE

(71) Applicant: THE AUTOMATION PARTNERSHIP (CAMBRIDGE) LIMITED, Hertfordshire (GB)

(72) Inventor: Neil Bargh, Hertfordshire (GB)

(73) Assignee: THE AUTOMATION PARTNERSHIP (CAMBRIDGE) LIMITED, Hertfordshire (GB)

( * ) Notice: Subject to any disclaimer, the term of this patent is extended or adjusted under 35 U.S.C. 154(b) by 0 days.

(21) Appl. No.: 16/617,153

(22) PCT Filed: May 30, 2018

(86) PCT No.: PCT/EP2018/064137
§ 371 (c)(1),
(2) Date: Nov. 26, 2019

(87) PCT Pub. No.: WO2018/219983
PCT Pub. Date: Dec. 6, 2018

(65) Prior Publication Data
US 2020/0096120 A1    Mar. 26, 2020

(30) Foreign Application Priority Data
Jun. 2, 2017    (EP) .................................... 17174206

(51) Int. Cl.
*F16K 7/04* (2006.01)
*F16K 41/12* (2006.01)

(52) U.S. Cl.
CPC .............. *F16K 7/045* (2013.01); *F16K 41/12* (2013.01)

(58) Field of Classification Search
CPC ... F16K 7/045; F16K 7/04; F16K 7/06; F16K 41/12; F16K 7/061; F16K 7/066; F16K 7/02
(Continued)

(56) References Cited

U.S. PATENT DOCUMENTS 4,559,045 A * 12/1985 Danby .................. A61M 39/28
604/250
5,092,856 A * 3/1992 Johnston ............... A61M 39/28
604/249
(Continued)

FOREIGN PATENT DOCUMENTS

CN        104339871 A    2/2015
CN        204942702 U    1/2016
(Continued)

*Primary Examiner* — Craig J Price
*Assistant Examiner* — Andrew J Rost
(74) *Attorney, Agent, or Firm* — Dilworth IP, LLC

(57) ABSTRACT

A proportional pinch valve for controlling the pressure of a fluid in a continuous flow system comprises an anvil for pinching a length of a tubing in the continuous flow system, and a drive mechanism including a displacement element for moving the anvil towards the tubing. The anvil is indirectly coupled to the displacement element via an elastic spring element. The elastic spring element provides a defined play (i.e. elasticity) for the anvil at least as long as the tubing is not fully pinched so that displacement of the anvil is force-controlled by the elastic spring element. A method of controlling the pressure of a fluid in a continuous flow system makes use of such a proportional pinch valve.

19 Claims, 3 Drawing Sheets

(58) Field of Classification Search
USPC .................................. 251/264, 7–8
See application file for complete search history.

(56) References Cited

U.S. PATENT DOCUMENTS

| | | | | |
|---|---|---|---|---|
| 5,165,873 A | * | 11/1992 | Meijer | ............... A61M 5/14228 |
| | | | | 417/474 |
| 5,814,004 A | * | 9/1998 | Tamari | ................ F04B 43/1253 |
| | | | | 604/6.1 |
| 8,622,365 B2 | * | 1/2014 | Fukano | ................... F16K 7/045 |
| | | | | 251/7 |
| 9,090,083 B2 | | 7/2015 | Tsuji | |
| 9,115,013 B2 | * | 8/2015 | Johnson | .................... C02F 1/34 |
| 9,803,754 B2 | * | 10/2017 | Thompson | ................. F16K 7/06 |
| 2010/0101664 A1 | | 4/2010 | Yamamoto et al. | |
| 2014/0346385 A1 | * | 11/2014 | Hasunuma | ......... F16K 31/1221 |
| | | | | 251/278 |
| 2015/0035913 A1 | | 2/2015 | Tsuji | |

FOREIGN PATENT DOCUMENTS

| | | | | |
|---|---|---|---|---|
| EP | 2236873 A1 | | 10/2010 | |
| GB | 2541221 A | | 2/2017 | |
| JP | H04136572 A | | 5/1992 | |
| WO | WO-2017025715 A1 | * | 2/2017 | ............ A61M 27/00 |

\* cited by examiner

PROPORTIONAL PINCH VALVE

The invention relates to a proportional pinch valve for controlling the pressure in a continuous flow system, especially for use in a cross-flow filtration system. The invention further relates to a method of controlling the pressure of a fluid in a continuous flow system using a proportional pinch valve.

BACKGROUND OF THE INVENTION

According to its basic operation principle, a pinch valve usually employs a member that directly acts on a length of elastomeric process tubing. Forcing the tubing together will create a seal that is equivalent to the tubing's permeability. Pinch valves are typically used to control medium pressure in applications where the medium needs to be completely isolated from any internal valve parts or entrapments. Pinch valves are thus preferably employed in sterile single use systems. Whereas standard proportional valves for controlling pressure are typically of a design that does not provide a simple disposable flow path, pinch valves enable the use of a clean and very low cost disposable flow path, namely the process tubing itself. The process tubing can be made from an elastomer material that is suitable for gamma sterilisation, for example.

However, pinch valves are generally used for simple on/off flow control only. In theory, small solenoid driven pinch valves for small tubing might be designed to optimise proportional control, but in practice pinch valves are typically designed as mere shut-off valves. It has to be further considered that larger tubing and/or higher pressures require high pinch forces, and solenoid driven pinch valves become accordingly large and costly. Therefore, larger pinch valves often use a motor driven leadscrew or ballscrew to move an anvil to directly pinch the tubing.

A significant problem in using pinch valves for proportional control is the fact that small changes in the tubing internal "pinched" size creates large changes in pressure or flow. This means that small movements of a pinching anvil cause large changes to the pressure or flow. During operation this results in coarse pressure or flow control and/or frequent control point changes. For good control, very small anvil movements in the order of 1 micrometre are required but still do not necessarily lead to stable control. Very small movements can be achieved by using a fine resolution leadscrew and/or other precision mechanisms. However, a fine resolution leadscrew will typically only move at a slow linear speed, and this can be a problem when the valve is required to open or close quickly.

SUMMARY OF THE INVENTION

It is an object of the invention to provide a low cost pinch valve allowing for a stable proportional control of pressure over a large operating range.

The above problem is solved by a proportional pinch valve according to claim 1. Advantageous and expedient embodiments of the invention are apparent from the dependent claims.

The invention provides a proportional pinch valve for controlling the pressure in a continuous flow system. The proportional pinch valve comprises an anvil for pinching a length of a tubing in the continuous flow system, and a drive mechanism including a displacement element for moving the anvil towards the tubing. According to the invention, the anvil is indirectly coupled to the displacement element via an elastic spring element. The elastic spring element provides a defined play (i.e. elasticity) for the anvil at least as long as the tubing is not fully pinched so that displacement of the anvil is force-controlled by the elastic spring element. This means that the anvil is not simply pressed into the tubing by the moving displacement element. According to the invention, pinching of the tubing is rather controlled by the force exerted to the anvil via the spring element interposed between the displacement element and the anvil. The invention makes use of the finding that changing from a displacement-controlled anvil, as used in common designs, to a force-controlled anvil, as realised in the present invention, provides significant advantages with respect to pressure control. In common designs, pressure control is very sensitive to the displacement caused by the drive mechanism as the anvil is directly coupled to the displacement element and directly acts on the tubing. This means that pinching of the tubing is directly proportional to the movement of the displacement element. However, these common designs do not take into account the influence of the back pressure caused by the medium flowing through the tubing and possible variations thereof during operation. If, for example, the back pressure increases, there is no possibility to increase the flow through the pinched tubing in order to offset the pressure increase. By contrast, in the design according to the invention, the anvil has a defined "play" (i.e. elasticity) when the tubing is pinched due to its coupling to the elastic spring element. Accordingly, if the back pressure increases at a given pinch force, the increased pressure of the fluid is able to force the pinched surfaces of the tubing apart, thus resulting in an increased flow. This provides greater stability of the pressure setpoint and reduces the control sensitivity. In this way, the proportional pinch valve according to the invention also advantageously provides the basic functionality of a pressure release/relief valve which will be discussed further below in connection with a preferred embodiment.

The intended application of the invention is to control pressure in ultrafiltration/diafiltration (UF/DF) systems, but it is not limited thereto. As already indicated, the basic benefit of the invention is stable pressure control over a large pressure range with a low cost disposable flow path.

According to a preferred embodiment of the proportional pinch valve, the elastic spring element is a coil spring. A coil spring can easily be integrated in the drive mechanism. Depending on the actual application and the desired force/displacement behaviour, a coil spring with an appropriate spring rate is usually easily available. However, it is also possible to use a specially configured gas cylinder or an appropriate elastomer member instead of a coil spring.

The displacement element used in the drive mechanism preferably is a leadscrew nut arranged on a leadscrew. A leadscrew can easily be turned by a stepper motor or by a handwheel, while the leadscrew nut translates this turning motion into the required linear motion. Leadscrews and leadscrew nuts are proven linkage components and can be chosen according to the given requirements.

In a combination of a leadscrew and a leadscrew nut used in the drive mechanism together with a coil spring used as the spring element, one end of the coil spring can be supported on the leadscrew nut and the other end of the coil spring can be supported on the anvil to provide the desired elastic coupling.

In an automated version of the proportional pinch valve, the drive mechanism includes an automated drive, preferably a stepper motor, for displacing the displacement element. A stepper motor has the advantage that the motor's position can be commanded to move and hold at one of a number of equal steps without any feedback sensor, as long as the motor is carefully sized to the application in respect to torque and speed.

For holding and fixing the tubing in the proportional pinch valve, a support member having one or more receptacles and a cover plate cooperating with the support member can be used. The cover plate preferably provides a resting surface against which the tubing is pressed when the anvil is moved towards the tubing.

In a conventional pinch valve, the pinched length is rather small, i.e. less than 5 mm, to minimize the force required to close the valve. However, it has been recognized that it is possible and advantageous to lengthen the distance over which the tubing is pinched, as compared to previous designs. Therefore, the length of a front surface of the anvil contacting the tubing is application specific but preferably in the range of 5 to 10 mm. For low pressure applications (less than 1 bar) a longer contact length may be desirable. In addition to increasing control performance, the lengthened pinched tubing also reduces the peak shear stress on liquid passing through the valve as the pressure drop through the valve occurs over a longer distance compared to conventional (pinch) valve designs.

In cases where a high differential pressure is needed across the proportional pinch valve, it is a problem that a significant proportion of the internal surfaces of the pinched tubing are in contact with each other with flow being possible only at either edge of the pinched tubing. Under these circumstances sensitivity to the pressure in the tube is significantly reduced. To overcome this problem, a (further) enhancement of the length of pinched tubing is achieved by providing a ridge projecting from a front face of the anvil facing the tubing. The ridge preferably extends perpendicular to a longitudinal direction of the tubing. The purpose of the ridge is to more effectively use the pressure in the tube to act on the anvil and hence on the spring. In particular, the ridge is used to create most of the pressure drop across the short length of the ridge and therefore allowing the internal tube surfaces elsewhere in the pinched section to not be in contact with each other. In this way, those tube surfaces are subject to the pressure within the tube and therefore can act on the anvil. The ridge can be either upstream, downstream, in the middle or any other position along the length of the pinched tubing, depending on whether it is important to control pressure upstream or downstream. A universal proportional pinch valve would have the ridge in the middle of the pinched tube.

According to an advantageous aspect of the invention, a seal is provided, preferably a rubber diaphragm, for sealing a free space around the pinched tubing from the drive mechanism. The seal prevents process fluids from entering and contaminating the drive mechanism in the interior of the valve in case the pinched tubing is damaged.

According to another advantageous aspect of the invention, a pin coupled to the displacement element cooperates with a slot decoupled from the displacement element in order to prevent the displacement element from unintentional rotation. The slot may be formed in a housing member of the proportional pinch valve in which the displacement element moves.

A position sensor may be provided for detecting at least a home position of the displacement element. For the detection of the home position, it is possible to use the above-mentioned pin as a position indicating element, giving the pin a double function.

Regarding the behaviour of the proportional pinch valve in an end position, in which the tubing is fully pinched by the anvil, the invention offers different concepts as will be explained below.

According to a first design principle, the displacement element is in contact with the anvil when the displacement element is displaced into the end position in which the tubing is fully pinched. Thus, a high force can be applied to the tubing, and it is ensured that the anvil remains in its position.

According to a second design principle, the displacement element is not in contact with the anvil when the displacement element is displaced into the end position in which the tubing is fully pinched by the anvil. This design allows the proportional pinch valve to act as a pressure release/relief valve if a maximum allowed system pressure is exceeded. The maximum pressure can be controlled during operation or by the design by setting the maximum displacement of the displacement element to define the end position and hence the maximum force that the spring element applies to the anvil.

According to a more sophisticated design, a switch mechanism is provided for switching the driving mechanism between a first mode, in which the anvil is directly coupled to the displacement element, and a second mode, in which the anvil is indirectly coupled to the displacement element via the spring element. Depending on the circumstances, the more appropriate control, i.e. force-controlled pinching or displacement-controlled pinching, can be chosen as desired.

The invention also provides a method of controlling the pressure of a fluid in a continuous flow system using a proportional pinch valve as described above. The spring of the proportional pinch valve allows self-correction of the pressure, especially in a case of a back-pressure or other circumstances undesirably deviating the pressure away from a setpoint.

In particular, according to an important aspect of the invention, the elastic spring element provides a defined play (elasticity) for the anvil at least as long as the tubing is not fully pinched so that displacement of the anvil is force-controlled by the elastic spring element.

Accordingly, in response to a back-pressure of the fluid flowing through the tubing at a given pinch force acting on the surrounding wall of the tubing, the pinched surfaces of the tubing can be forced apart against the bias of the elastic spring element, thus resulting in an increased flow. This provides greater stability of the pressure setpoint and reduces the control sensitivity to noise.

The method according to the invention is preferably used in, but not limited to, a cross-flow filtration system.

BRIEF DESCRIPTION OF THE DRAWINGS

Further features and advantages of the invention will become apparent from the following description and from the accompanying drawings to which reference is made. In the drawings.

DETAILED DESCRIPTION OF THE INVENTION

Figure 1:
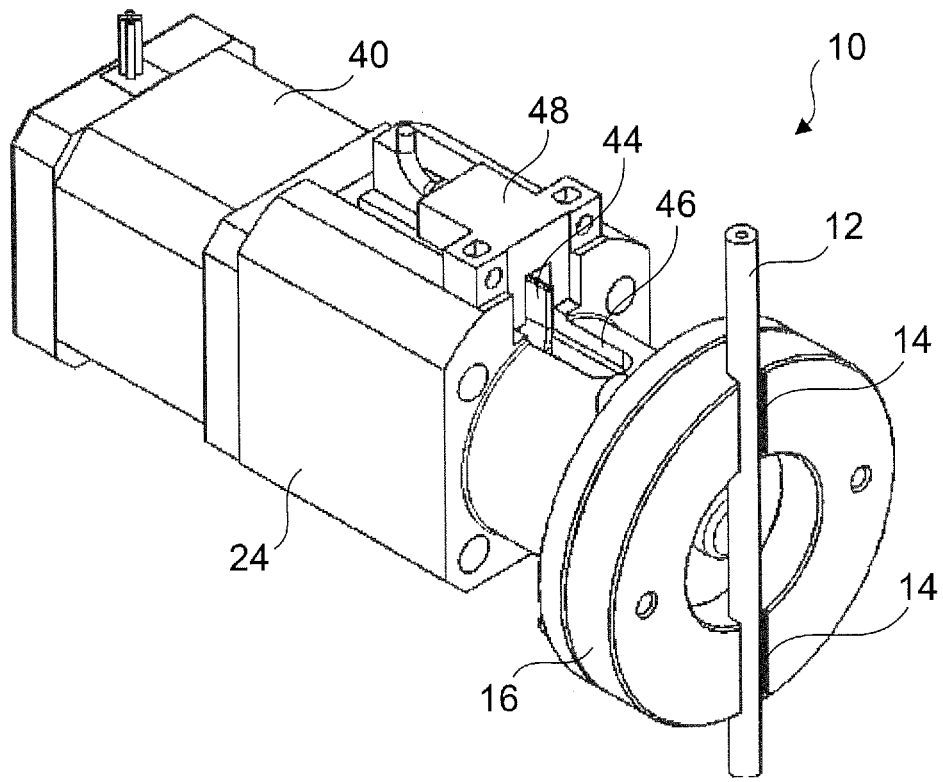
FIG. 1 shows a proportional pinch valve according to the invention with a loaded tubing but without the front cover plate.
Figure 2:
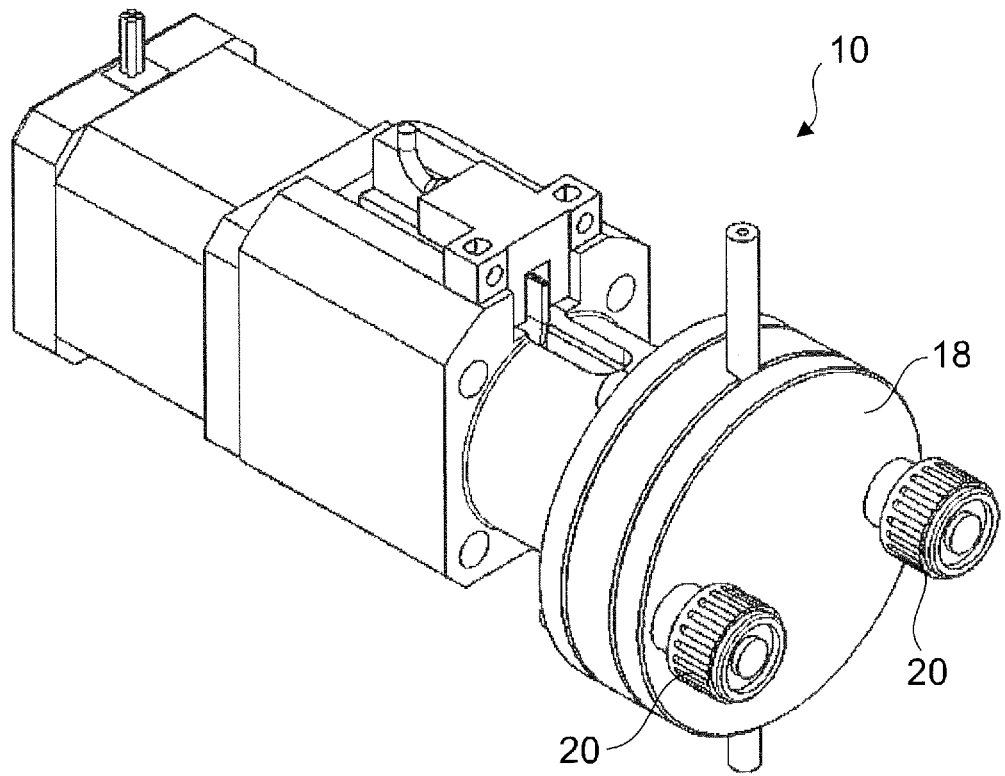
FIG. 2 shows the proportional pinch valve with the loaded tubing and the front cover plate.

Referring to FIGS. 1 and 2, a proportional pinch valve 10 is shown for controlling pressure of a medium flowing through a flexible tubing 12 made from a soft elastomer material, for example. In the preferred applications, the tubing 12 is a disposable pipe of a single-use component or system, such as a UF/DF cross-flow filtration system.

The tubing 12 is received in opposite receptacles 14 formed on a front side of an annular support member 16. After loading the tubing 12, a front cover plate 18 is fixed to the front side of the support member 16 by screws 20 or other suitable attachment means as shown in FIG. 2. The receptacles 14 are covered by the front cover plate 18, and the tubing 12 is thus fixed in axial and radial directions.

The section of the tubing 12 between the opposite receptacles 14 is exposed to an anvil 22. In particular, the anvil 22 faces the side of the tubing 12 opposite to the side of the tubing 12 which rests against the front cover plate 18. The anvil 22 can be seen in FIGS. 3 to 5, which show the proportional pinch valve 10 in longitudinal section.

The anvil 22 is radially supported in a housing member 24 so as to be axially movable towards and away from the exposed section of the tubing 12. The front surface of the anvil 22 facing the tubing 12 is of such dimensions that the length of the tubing 12 that can be contacted by the anvil 22 is application specific but preferably in the range of 5 to 10 mm. For low pressure applications (less than 1 bar) a longer contact length may be desirable.

A disk-shaped rubber diaphragm 26 is provided to seal the free space 28 of the support member 16 where the tubing 12 is exposed from the internal sliding surfaces of the proportional pinch valve 10, in particular the peripheral surface portion of the anvil 22 engaging the surrounding inner surface of the housing member 24. The outer periphery of the diaphragm 26 is clamped between the front end of the housing member 24 and the opposing surface of the support member 16. The inner periphery of the diaphragm 26 is received in a circumferential groove 30 of the anvil 22.

The anvil 22 is indirectly coupled to a displacement element. In the preferred embodiment shown in the drawings, the displacement element is a leadscrew nut 32 which is arranged on a leadscrew 34. More specifically, the anvil 22 is indirectly coupled to the leadscrew nut 32 via an interposed elastic spring element 36.

The spring element 36 here is a coil spring. One end of the coil spring is placed on a projection 38 at the end of the leadscrew nut 32 facing the back side of the anvil 22 and supported by an adjacent shoulder. The other end of the coil spring is supported by a flange of the anvil 22.

However, instead of a coil spring, it is also possible to employ a gas cylinder or an elastomer member as the spring element 36, for example.

The leadscrew 34 is driven by a stepper motor 40 coupled to an electronic controller (not shown). In principle, the leadscrew 34 could also be driven manually by a handwheel or the like.

The leadscrew 34 and the leadscrew nut 32 are accommodated in the housing member 24 of the proportional pinch valve 10. A thrust bearing 42 resting on the stepper motor casing and surrounding the leadscrew 34 is able to support the axial load of the leadscrew nut 32.

A radially extending pin 44 is fixed to the leadscrew nut 32. The pin 44 cooperates with a slot 46 formed in the housing member 24 and extending in axial direction. The pin 44 extends through the slot 46 and prevents the leadscrew nut 32 from unintentional rotation.

Moreover, the pin 44 has another function. A position sensor 48 arranged on the housing member 24 is able to detect a home position of the pin 44.

Figure 3:
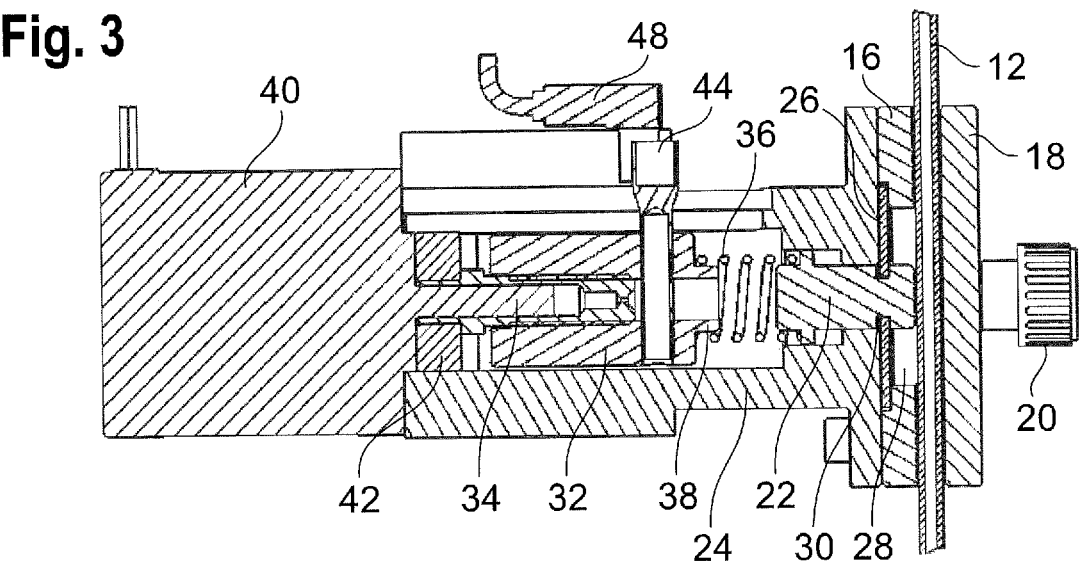
FIG. 3 shows the proportional pinch valve with tubing in longitudinal section in a first state.

The home position of the pin 44 corresponds to the first state of the proportional pinch valve 10, shown in FIG. 3, in which the anvil 22 is in a position not interfering with the tubing 12. In the home position, the spring element 36 is basically relaxed, which means that the anvil 22 exerts no significant pressure, or no pressure at all, on the tubing 12. Accordingly, the tubing 12 is not pinched, and the flow of the medium through the tubing 12 is not restricted.

Figure 4:
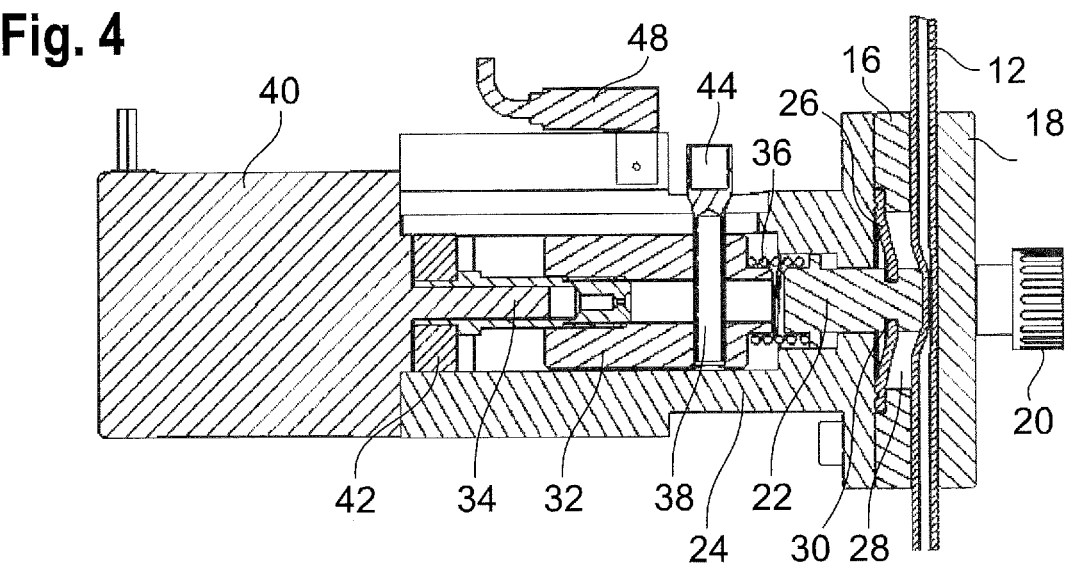
FIG. 4 shows the proportional pinch valve in longitudinal section with tubing in a second state.

FIG. 4 shows the proportional pinch valve 10 in a second state in which the tubing 12 is pinched. The stepper motor 40 has driven the leadscrew 34 so that the leadscrew nut 32 has axially moved a distance towards the tubing 12. The anvil 22 is thus pressed into the tubing 12 to an extent that the effective flow cross section of the tubing 12 is reduced. However, the flow is not completely blocked.

It is to be recalled here that the anvil 22 is not directly coupled to the leadscrew nut 32, but to the spring element 36. Accordingly, the pinching of the tubing 12 is not simply proportional to the displacement of the leadscrew nut 32, but controlled by the force indirectly transferred from the leadscrew nut 32 to the anvil 22 via the spring element 36. Since the spring element 36 is resilient, the counterforce of the tubing 12 acting on the anvil 22 can cause a compression of the spring element 36 to a certain extent. As a result, the force that the spring element 36 applies to the anvil 22 is balanced by the average pressure inside the tubing 12 (plus the force to deform the tubing 12).

The spring element 36 is chosen such that significant movement of the leadscrew 34 is required to create the change in force necessary to pinch the tubing 12. As an example, the spring element 36 chosen might be such that the ratio of leadscrew movement to pressure change is at least 10 times higher than in a pinch valve design without a spring element (e.g. if a leadscrew nut would directly displace an anvil). Therefore, using the spring element 36 allows fine tuning of the resulting force acting on the tubing 12 so that the pinching of the tubing 12 can be precisely adjusted.

Using the spring element 36 in the proportional pinch valve design can also make the pressure setpoint more stable. For example, if the upstream pressure is being controlled (as in the case of UF/DF), then an increase in the upstream pressure results in an increasing counterforce on the anvil 22. This in turn compresses the spring element 36 a little further, which allows the anvil 22 to decompress the tubing 12 a little. This decompression of the tubing 12 brings the pressure back to the target setpoint.

Furthermore, due to the increased length of the tubing 12 being pinched by the anvil 22 (as compared to conventional pinch valves), the proportional pinch valve 10 is made more sensitive to the pressure inside the tubing 12, which improves the sensitivity and increases the resolution of the pressure control.

Figure 5:
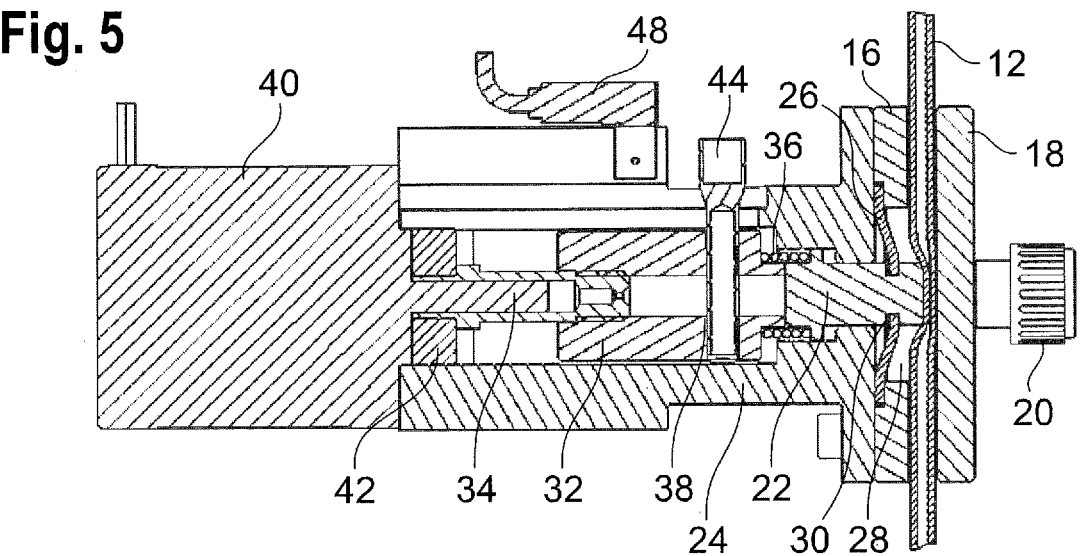
FIG. 5 shows the proportional pinch valve in longitudinal section with tubing in a third state.

In FIG. 5 the proportional pinch valve 10 is shown in a third state in which the anvil 22 is displaced to a maximum. The tubing 12 is fully pinched, and the flow of medium is interrupted.

According to a first design principle, as shown in FIG. 5, this third state of the proportional pinch valve 10 is characterised in that the projection 38 of the leadscrew nut 32 contacts the back side of the anvil 22 such that the spring element 36 no longer has any influence on the displacement of the anvil 22. This design provides a high security of the flow being pinched off, regardless of the pressure in the tubing 12 or the stiffness of the tubing 12.

According to a second design principle, not shown in the Figures, the third state of the proportional pinch valve 10 where the tubing 12 is fully pinched is achieved just by the force of the spring element 36, i.e. without the projection 38 of the leadscrew nut 32 contacting the back side of the anvil 22. Since according to this design the spring element 36 still allows a defined "play" (i.e. elasticity) of the anvil 22 in the direction away from the tubing 12, the proportional pinch valve 10 can be used as a pressure relief valve. For example, if the maximum working pressure of the filtration system using the tubing 12 is 3 bar, then, by design, when the leadscrew nut 32 is fully displaced (but not contacting the anvil 22), the force exerted on the tubing 12 by the anvil 22 via the spring element 36 is such that medium will be allowed to pass when the pressure in the tubing 12 is above 6 bar. This provides an added level of safety without the addition of a separate pressure relief valve.

According to a third design principle, not shown in the Figures, the proportional pinch valve 10 can make use of both the first and the second design principles. A switch mechanism is provided for switching between a pure displacement-controlled mode, in which the anvil 22 is directly coupled to the leadscrew nut 32, and a force-controlled mode, in which the anvil 22 is indirectly coupled to the leadscrew nut 32 via the spring element 36. The switch mechanism may employ, for example, a power actuated latch/coupling that can directly couple the leadscrew nut 32 and the anvil 22 together, or alternatively, a passive "click-click" mechanism that can be used to directly transmit force between the leadscrew nut 32 and the anvil 22.

Figure 6:
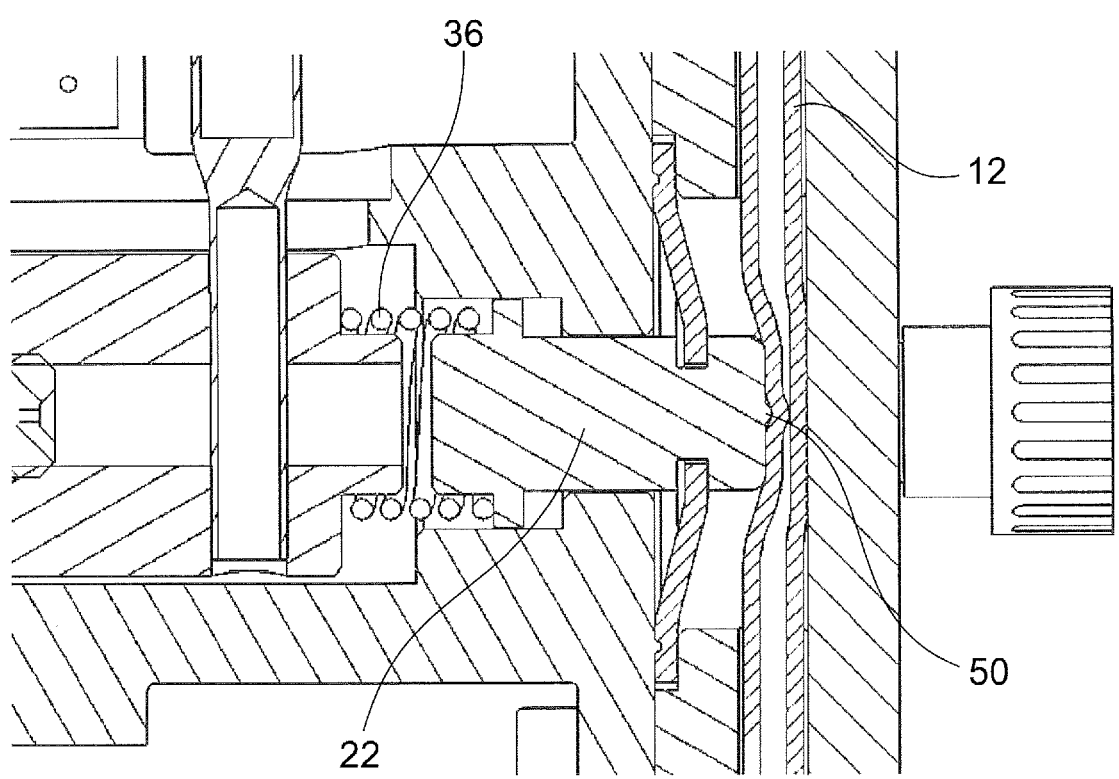
FIG. 6 shows a detail of a variant of the proportional pinch valve in which the anvil has a ridge with a loaded tubing in the second state in longitudinal section.

FIG. 6 shows a variant of the proportional pinch valve 10 with a differently shaped front face of the anvil 22. In particular, a ridge 50 of small height is provided which extends perpendicular to the loaded tubing 12. The purpose of the ridge 50 is to more effectively use the pressure in the tubing 12 to act on the anvil 22 and hence the spring element 36.

The ridge 50 is useful in cases where a high differential pressure is needed across the proportional pinch valve 10. The problem in these cases is that in the pinched condition of the tubing 12 a significant proportion of the internal surfaces of the tubing 12 are in contact with each other. Accordingly, medium flow is possible only at either edge of the pinched tubing 12. Under these circumstances, sensitivity to the pressure in the tubing 12 is significantly reduced. This problem is overcome by the ridge 50 as it further enhances the already elongated length of pinched tubing 12. Due to the ridge 50 most of the pressure drop is created across the short length of the ridge 50. Therefore, the internal tubing surfaces elsewhere in the pinched section are allowed to not be in contact with each other. In this way, the non-contacting tubing surfaces are subject to the pressure within the tubing 12 and therefore can act on the anvil 22.

The ridge 50 can be either upstream, downstream, in the middle or any other position along the length of the tubing section to be pinched. The position of the ridge 50 can be chosen depending on whether it is important to control pressure upstream or downstream. For example, if upstream pressure is to be controlled, then a ridge on the downstream side of the pinched tube would be used. A universal valve would have the ridge in the middle of the pinched tube.

In case of leaking of the tubing 12, the diaphragm 26 prevents process fluids from contaminating the valve components inside the housing member 24 as it isolates the area where the tubing 12 is pinched from the internal sliding surfaces of the proportional pinch valve 10.

LIST OF REFERENCE SIGNS

10 proportional pinch valve
12 tubing
14 receptacles
16 support member
18 front cover plate
20 screws
22 anvil
24 housing member
26 diaphragm
28 free space
30 groove
32 leadscrew nut
34 leadscrew
36 spring element
38 projection
40 stepper motor
42 thrust bearing
44 pin
46 slot
48 position sensor
50 ridge

The invention claimed is:

1. A method of controlling pressure of a fluid in a continuous flow system, comprising steps of:
    providing a proportional pinch valve comprising:
        an anvil for pinching a length of a tubing in the continuous flow system, and
        a drive mechanism including a displacement element for moving the anvil towards the tubing,
        the anvil being indirectly coupled to the displacement element via an elastic spring element;
    the displacement element moving the anvil towards the tubing and pressing the anvil into the tubing to an extent that an effective flow cross section of the tubing is reduced, but a flow through the tubing is not completely blocked; and
    the elastic spring element providing a defined play for the anvil at least as long as the tubing is not fully pinched so that displacement of the anvil is force-controlled by the elastic spring element in that the force applied to the anvil by the spring element is balanced by an average pressure inside the tubing plus a force to deform the tubing;
    wherein the displacement element can be displaced into an end position in which the tubing is fully pinched, the displacement element being in contact with the anvil in the end position.

2. The method of claim 1, characterised in that, in response to a back-pressure acting on the fluid flowing through the tubing, pinched surfaces of the tubing are forced apart against a bias of the elastic spring element.

3. The method of claim 1, characterised in that the continuous flow system is a cross-flow filtration system.

4. A proportional pinch valve for controlling pressure in a continuous flow system, the proportional pinch valve comprising:

an anvil for pinching a length of a tubing in the continuous flow system, and a drive mechanism including a displacement element for moving the anvil towards the tubing and pressing the anvil into the tubing to an extent that an effective flow cross section of the tubing is reduced, but a flow through the tubing is not completely blocked, the anvil being indirectly coupled to the displacement element via an elastic spring element, the elastic spring element providing a defined play for the anvil at least as long as the tubing is not fully pinched so that displacement of the anvil is force-controlled by the elastic spring element in that the force applied to the anvil by the spring element is balanced by an average pressure inside the tubing plus a force to deform the tubing, further comprising a switch mechanism for switching the driving mechanism between a first mode, in which the anvil is directly coupled to the displacement element, and a second mode, in which the anvil is indirectly coupled to the displacement element via the spring element.

5. The proportional pinch valve according to claim 4, characterised in that the spring element is a coil spring.

6. The proportional pinch valve according to claim 5, characterised in that the displacement element is a leadscrew nut arranged on a leadscrew.

7. The proportional pinch valve according to claim 6, characterised in that one end of the coil spring is supported on the leadscrew nut and the other end of the coil spring is supported on the anvil.

8. The proportional pinch valve according to claim 4, characterised in that the drive mechanism includes an automated drive for displacing the displacement element.

9. The proportional pinch valve according to claim 8, characterised in that the automated drive comprises a stepper motor for displacing the displacement element.

10. The proportional pinch valve according to claim 4, characterised by a support member having one or more receptacles and a cover plate cooperating with the support member for holding the tubing.

11. The proportional pinch valve according to claim 4, characterised in that a length of a front surface of the anvil contacting the tubing to a diameter of the non-pinched tubing is greater than 5 mm.

12. The proportional pinch valve according to claim 4, characterised by a ridge projecting from a front face of the anvil facing the tubing.

13. The proportional pinch valve according to claim 12, characterised in that the ridge extends perpendicular to a longitudinal direction of the tubing.

14. The proportional pinch valve according to claim 4, characterised by a seal, for sealing a free space around the pinched tubing from the drive mechanism.

15. The proportional pinch valve according to claim 14, wherein the seal for sealing the free space around the pinched tubing from the drive mechanism comprises a rubber diaphragm.

16. The proportional pinch valve according to claim 4, characterised by a pin coupled to the displacement element, the pin cooperating with a slot decoupled from the displacement element in order to prevent the displacement element from unintentional rotation.

17. The proportional pinch valve according to claim 4, characterised by a position sensor for detecting at least a home position of the displacement element.

18. The proportional pinch valve according to claim 4, characterised in that the displacement element can be displaced into an end position in which the tubing is fully pinched, the displacement element not being in contact with the anvil in the end position.

19. A proportional pinch valve for controlling pressure in a continuous flow system, the proportional pinch valve comprising:

an anvil for pinching a length of a tubing in the continuous flow system, and a drive mechanism including a displacement element for moving the anvil towards the tubing, the anvil being indirectly coupled to the displacement element via an elastic spring element, the elastic spring element providing a defined play for the anvil at least as long as the tubing is not fully pinched so that displacement of the anvil is force-controlled by the elastic spring element, wherein the displacement element can be displaced into an end position in which the tubing is fully pinched, the displacement element being in contact with the anvil in the end position.

\* \* \* \* \*